US009471563B2

(12) United States Patent
Trese

(10) Patent No.: US 9,471,563 B2
(45) Date of Patent: Oct. 18, 2016

(54) SYSTEMS, METHODS AND MEDIA FOR TRANSLATING INFORMATIONAL CONTENT

(71) Applicant: SDL Inc., Wakefield, MA (US)

(72) Inventor: Andrew Trese, West Chester, PA (US)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 14/325,198

(22) Filed: Jul. 7, 2014

(65) Prior Publication Data

US 2015/0154180 A1 Jun. 4, 2015

Related U.S. Application Data

(63) Continuation of application No. 13/037,262, filed on Feb. 28, 2011, now abandoned.

(51) Int. Cl.
*G06F 17/24* (2006.01)
*G06Q 30/02* (2012.01)
*G06Q 50/22* (2012.01)
*G06Q 10/10* (2012.01)
*G06F 17/28* (2006.01)

(52) U.S. Cl.
CPC ........... *G06F 17/28* (2013.01); *G06F 17/2836* (2013.01)

(58) Field of Classification Search
CPC ............. G06F 17/289; G06F 17/2785; G06F 17/30864; G06F 17/2247; G06F 17/24; G06F 9/4448; G06Q 30/02; G06Q 10/10; G06Q 10/067; G06Q 10/02
USPC .......... 704/2, 8, 9; 705/1.1, 348, 5; 707/749, 707/731, 769, 608; 709/200, 224; 715/234, 715/255
See application file for complete search history.

(56) References Cited

U.S. PATENT DOCUMENTS

D290,952 S 7/1987 Price
D291,086 S 7/1987 Price
(Continued)

FOREIGN PATENT DOCUMENTS

EP 2909742 A2 8/2015
JP 2008026971 6/2012
(Continued)

OTHER PUBLICATIONS

Non-Final Office Action, Nov. 13, 2012, U.S. Appl. No. 13/037,262, filed Feb. 28, 2011.
(Continued)

*Primary Examiner* — Pierre-Louis Desir
*Assistant Examiner* — Anne Thomas-Homescu
(74) *Attorney, Agent, or Firm* — Carr & Ferrell LLP

(57) ABSTRACT

Systems, methods, and media for translating informational content via a publishing server are provided herein. Methods may include receiving a request for informational content from a visitor device, the request including a language preference, responsive to the request, locating informational content stored in a database based upon analytical data corresponding to the visitor device, translating at least a portion of the informational content utilizing the language preference of the request if a language of the informational content does not correspond to the language preference of the request, and storing the translated at least a portion of the informational content in the database associated with the publishing server.

21 Claims, 4 Drawing Sheets

(56) References Cited

U.S. PATENT DOCUMENTS

| | | | | |
|---|---|---|---|---|
| 5,677,835 | A * | 10/1997 | Carbonell | G06F 17/21 704/8 |
| 5,768,603 | A * | 6/1998 | Brown | G06F 17/2755 704/232 |
| 6,014,628 | A * | 1/2000 | Kovarik, Jr. | G06Q 10/02 700/226 |
| 6,347,316 | B1 * | 2/2002 | Redpath | G06F 17/289 |
| 7,219,123 | B1 * | 5/2007 | Fiechter | H04M 1/72561 704/E15.045 |
| 7,295,963 | B2 | 11/2007 | Richardson et al. | |
| 8,548,995 | B1 * | 10/2013 | Curtiss | G06F 17/30864 707/726 |
| 2001/0027460 | A1 | 10/2001 | Yamamoto et al. | |
| 2002/0165724 | A1 * | 11/2002 | Blankesteijn | G06Q 30/06 705/1.1 |
| 2004/0006585 | A1 * | 1/2004 | Paulus | G06Q 10/10 709/200 |
| 2004/0006744 | A1 * | 1/2004 | Jones | G06F 17/2229 715/237 |
| 2004/0064552 | A1 * | 4/2004 | Chong | G06F 11/3006 709/224 |
| 2004/0088647 | A1 * | 5/2004 | Miller | G06F 17/243 715/234 |
| 2004/0167768 | A1 * | 8/2004 | Travieso | G06F 17/289 704/2 |
| 2004/0205656 | A1 | 10/2004 | Reulein et al. | |
| 2005/0177358 | A1 * | 8/2005 | Melomed | G06F 17/3043 704/2 |
| 2006/0031225 | A1 * | 2/2006 | Palmeri | G06F 17/30566 |
| 2006/0155716 | A1 * | 7/2006 | Vasishth | G06Q 10/06 |
| 2006/0184410 | A1 * | 8/2006 | Ramamurthy | G06Q 10/10 706/8 |
| 2006/0248084 | A1 * | 11/2006 | Sack | G06F 21/6227 |
| 2007/0073544 | A1 * | 3/2007 | Millett | G10L 13/00 704/277 |
| 2007/0106633 | A1 * | 5/2007 | Reiner | G06F 19/321 |
| 2007/0112851 | A1 * | 5/2007 | Tomic | G06F 17/2247 |
| 2007/0136065 | A1 * | 6/2007 | Chiu | G06F 17/275 704/257 |
| 2007/0136284 | A1 * | 6/2007 | Cobb | G06F 17/2229 |
| 2007/0188657 | A1 * | 8/2007 | Basson | H04N 21/233 348/468 |
| 2007/0198245 | A1 * | 8/2007 | Kamatani | G10L 15/26 704/2 |
| 2007/0211071 | A1 * | 9/2007 | Slotznick | G06F 17/30899 345/594 |
| 2007/0294076 | A1 * | 12/2007 | Shore | G06F 17/2836 704/2 |
| 2007/0294080 | A1 * | 12/2007 | Bangalore | G06F 17/289 704/7 |
| 2008/0040635 | A1 * | 2/2008 | Larcheveque | G06F 17/2247 714/49 |
| 2008/0077391 | A1 * | 3/2008 | Chino | G06F 17/2827 704/7 |
| 2008/0077392 | A1 * | 3/2008 | Kamatani | G06F 17/2827 704/7 |
| 2008/0088437 | A1 * | 4/2008 | Aninye | G07C 9/00111 340/539.13 |
| 2008/0102433 | A1 * | 5/2008 | Rogers | G09B 7/02 434/350 |
| 2008/0133245 | A1 * | 6/2008 | Proulx | G06F 17/2818 704/277 |
| 2008/0134018 | A1 * | 6/2008 | Kembel | G06F 17/30899 715/234 |
| 2008/0159495 | A1 * | 7/2008 | Dahan | G06F 17/30864 379/93.01 |
| 2008/0183758 | A1 * | 7/2008 | Kennedy | G06F 17/3089 |
| 2008/0195372 | A1 * | 8/2008 | Chin | G06F 17/289 704/2 |
| 2008/0254430 | A1 * | 10/2008 | Woolf | G09B 5/00 434/322 |
| 2008/0254433 | A1 * | 10/2008 | Woolf | G09B 5/00 434/332 |
| 2008/0270142 | A1 * | 10/2008 | Srinivasan | G10L 15/26 704/270.1 |
| 2009/0013162 | A1 * | 1/2009 | Nandan | G06F 8/61 713/1 |
| 2009/0048821 | A1 * | 2/2009 | Yam | G06F 3/0486 704/3 |
| 2009/0222257 | A1 * | 9/2009 | Sumita | G10L 15/26 704/3 |
| 2009/0327294 | A1 * | 12/2009 | Bailor | G06F 17/24 |
| 2010/0115284 | A1 * | 5/2010 | Hahn | G06F 21/64 713/179 |
| 2010/0185648 | A1 * | 7/2010 | Chauhan | G06F 3/167 707/769 |
| 2011/0029300 | A1 * | 2/2011 | Marcu | G06F 17/289 704/2 |
| 2011/0077933 | A1 * | 3/2011 | Miyamoto | G06F 17/289 704/2 |
| 2011/0082683 | A1 * | 4/2011 | Soricut | G06F 17/289 704/2 |
| 2011/0082684 | A1 * | 4/2011 | Soricut | G06F 17/289 704/2 |
| 2011/0087680 | A1 * | 4/2011 | Murdock | G06Q 30/02 707/749 |
| 2011/0137636 | A1 * | 6/2011 | Srihari | G06F 17/2863 704/2 |
| 2011/0184722 | A1 | 7/2011 | Sneddon et al. | |
| 2011/0225104 | A1 * | 9/2011 | Soricut | G06F 17/289 705/348 |
| 2012/0005156 | A1 * | 1/2012 | Grant | G06F 17/2288 707/608 |
| 2012/0078609 | A1 * | 3/2012 | Chaturvedi | G06F 17/28 704/3 |
| 2012/0221319 | A1 * | 8/2012 | Trese | G06F 17/28 704/2 |
| 2012/0221593 | A1 * | 8/2012 | Trese | G06F 17/30303 707/769 |
| 2013/0055074 | A1 * | 2/2013 | Trese | G06F 17/2288 715/255 |
| 2013/0144605 | A1 * | 6/2013 | Brager | G06F 17/3061 704/9 |
| 2014/0114642 | A1 * | 4/2014 | van den Oever | G06F 17/2818 704/2 |
| 2014/0289702 | A1 * | 9/2014 | McMahon | G06F 21/60 717/120 |

FOREIGN PATENT DOCUMENTS

| | | |
|---|---|---|
| WO | WO2012/118764 | 9/2012 |
| WO | WO 2012/118765 | 9/2012 |
| WO | WO 2013/028322 | 2/2013 |
| WO | WO 2014/060549 | 4/2014 |

OTHER PUBLICATIONS

Final Office Action, Jun. 17, 2013, U.S. Appl. No. 13/037,262, filed Feb. 28, 2011.
Non-Final Office Action, May 22, 2013, U.S. Appl. No. 13/037,273, filed Feb. 28, 2011.
Final Office Action, Feb. 24, 2014, U.S. Appl. No. 13/037,273, filed Feb. 28, 2011.
Non-Final Office Action, Mar. 23, 2015, U.S. Appl. No. 13/037,273, filed Feb. 28, 2011.
Final Office Action, Oct. 9, 2013, U.S. Appl. No. 13/217,122, filed Aug. 24, 2011.
Non-Final Office Action, Dec. 17, 2012, U.S. Appl. No. 13/217,122, filed Aug. 24, 2011.
Non-Final Office Action, Feb. 4, 2015, U.S. Appl. No. 13/217,122, filed Aug. 24, 2011.
Non-Final Office Action, Apr. 22, 2014, U.S. Appl. No. 13/656,543, filed Oct. 19, 2012.
Non-Final Office Action, Mar. 11, 2015, U.S. Appl. No. 13/656,543, filed Oct. 19, 2012.
International Search Report and Written Opinion with mail date of May 31, 2012, re International Application No. PCT/US2012/026815 filed Feb. 27, 2012.
International Search Report and Written Opinion with mail date of Jun. 22, 2012, re International Application No. PCT/US2012/026814 filed Feb. 27, 2012.

(56) References Cited

OTHER PUBLICATIONS

Dunlap et al., "ReVirt: Enabling Intrusion Analysis through Virtual-Machine Logging and Replay", Dec. 11, 2002, USENIX Association.
Pun et al., "Audit Trail Analysis for Traffic Intensive Web Application", 2009, IEEE.
Akkus et al., "Non-Tracking Web Analytics", Oct. 18, 2012, ACM.
Pusara, M., "An Examination of User Behavior for Re-Authentication", Aug. 2007, Center for Education and Research in Information Assurance and Security, Purdue University.
Invitation to Pay Additional Fees with mail date of Mar. 26, 2014, re International Application No. PCT/EP2013/071781 filed Oct. 17, 2013.
Bernth et al., "The Effect of Source Analysis on Translation Confidence", In: "Envisioning Machine Translation in the Information Future", Jan. 1, 2000, p. 89-99.
Uchimoto et al., "Automatic Rating of Machine Translatability", 10th Machine Translation Summit (MT Summit X), Sep. 12, 2005, p. 235-242.
Underwood et al., "Translatability Checker: A Tool to Help Decide Whether to Use MT", Proceedings of MT Summit VIII: Machine Translation in the Information Age., Jul. 18, 2001, p. 1-4.
Choumane et al., "Integrating translation services within a structured editor", Proceedings of the 2005 ACM Symposium on Document Engineering, DOCENG '05, Nov. 2, 2005, p. 165-167.
Venkatapathy et al., "An SMT-driven Authoring Tool", Proceedings of COLING 2012: Demonstration Papers COLING 2012, Dec. 8, 2012, p. 459-466.
International Search Report and Written Opinion mailed Jul. 2, 2014 in Application No. PCT/EP2013/071781 filed Oct. 17, 2013.
International Search Report and Written Opinion mailed Oct. 16, 2012 in Application No. PCT/US2012/049063 filed Jul. 31, 2012.
Ishida, "W3C I18n Tutorial: Declaring Language in XHTML and HTML," Oct. 27, 2010, www.w3.org/International/tutorials/language-decl. (pp. 1-7).
Final Office Action, Sep. 3, 2015, U.S. Appl. No. 13/037, 273, filed Feb. 28, 2011.
Final Office Action, Aug. 5, 2015, U.S. Appl. No. 13/217,122, filed Aug. 24, 2011.
Final Office Action, Jun. 30, 2015, U.S. Appl. No. 13/656,543, filed Oct. 19, 2012.
Non-Final Office Action, Feb. 25, 2016, U.S. Appl. No. 13/656,543, filed Oct. 19, 2012.
Non-Final Office Action, Jun. 28, 2016, U.S. Appl. No. 13/037,273, filed Feb. 28, 2011.

\* cited by examiner

SYSTEMS, METHODS AND MEDIA FOR TRANSLATING INFORMATIONAL CONTENT

CROSS-REFERENCE TO RELATED APPLICATIONS

The present U.S. patent application is a continuation of and claims the priority benefit of U.S. patent application Ser. No. 13/037,262, entitled "Systems, Methods and Media for Translating Informational Content," filed on Feb. 28, 2011, which is hereby incorporated by reference herein, including all references cited therein. This continuation U.S. patent application is also related to U.S. patent application Ser. No. 13/037,273, entitled "Systems, Methods, and Media For Generating Analytical Data," filed Feb. 28, 2011, U.S. patent application Ser. No. 12/510,913, entitled "Translating Documents Based On Content," filed Jul. 28, 2009, U.S. patent application Ser. No. 12/572,021, entitled "Providing Machine-Generated Translations and Corresponding Trust Levels," filed Oct. 1, 2009, U.S. patent application Ser. No. 12/720,536, entitled "Predicting the Cost Associated with Translating Textual Content," filed Mar. 9, 2010, and U.S. patent application Ser. No. 12/820,061, entitled "Providing Human-Generated and Machine-Generated Trusted Translations, " filed Jun. 21, 2010, the disclosures of the aforementioned applications are incorporated herein by reference.

FIELD OF THE INVENTION

The present technology relates generally to translating informational content via a publishing server, and more specifically, but not by way of limitation, to systems, methods, and media for translating informational content. In some embodiments, the systems, methods, and media may be adapted to translate informational content, dynamically, utilizing both analytical data and language preferences.

BACKGROUND

Commonly utilized methods for translating information content include human or manual translation of the informational content from a first language to one or more different languages. While human translation may create suitable translations, the cost associated with human translation can be prohibitive if the informational content needs to be translated into a plurality of languages, or requires frequent translations due to frequent modification of the informational content.

Therefore, many different methods and systems have been created to automatically translate informational content via mechanical translators (e.g., computing systems adapted to translate informational content). Unfortunately, commonly utilized mechanical translators translate static informational content and provide no mechanisms for verifying the accuracy of the translations. For example, some mechanical translators will scrape textual data from a content source such as a published web page or document, translate the text, and provide the text to end users. Therefore, mechanical translators are not adapted to translate informational content that has been gathered from a data source in a raw (e.g., non-rendered) format such as XML.

SUMMARY OF THE INVENTION

According to some embodiments, methods for translating informational content are provided herein. Such methods may include receiving a request for informational content from a computing system, the request including a language preference, responsive to the request, locating informational content stored in a database based upon analytical data corresponding to the computing system, translating at least a portion of the informational content utilizing the language preference of the request if a language of the informational content does not correspond to the language preference of the request, and storing the translated at least a portion of the informational content in the database associated with the publishing server.

In other embodiments, systems for translating informational content may include a memory for storing executable instructions for translating informational content, and a processor configured to execute the executable instructions stored in the memory to receive a request for informational content from a computing system, the request including a language preference, responsive to the request, locate informational content stored in a database based upon analytical data corresponding to the computing system, translate at least a portion of the informational content utilizing the language preference of the request if the language of the informational content does not correspond to the language preference of the request, and store the translated at least a portion of the informational content in the database associated with the publishing server.

Other embodiments of the present technology may include a non-transitory computer readable storage medium having a computer program embodied thereon, the computer program executable by a processor in a computing system to perform a method for translating informational content. The exemplary method for translating informational content may include receiving a request for informational content from a computing system, the request including a language preference, responsive to the request, locating informational content stored in a database based upon analytical data corresponding to the computing system, translating at least a portion of the informational content utilizing the language preference of the request if a language of the informational content does not correspond to the language preference of the request, and storing the translated at least a portion of the informational content in the database associated with the publishing server.

DETAILED DESCRIPTION OF EXEMPLARY EMBODIMENTS

Figure 1:
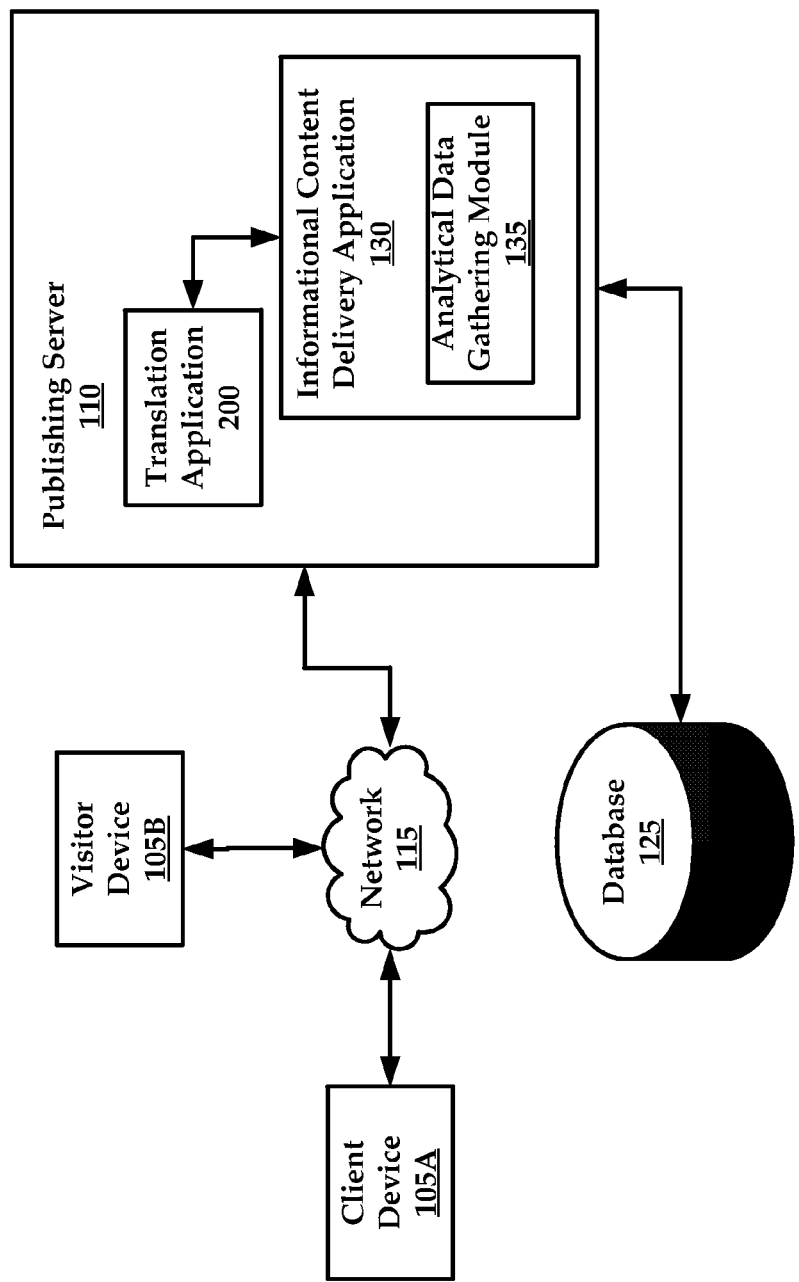
FIG. 1 is a schematic diagram of an exemplary architecture of a system utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

As stated above, the systems and methods of the present technology may be adapted to translate informational content. It will be understood that in some embodiments, the informational content may be created in an extensible markup language format. As such, translation of the informational content may be facilitated by translation of the informational content in its extensible markup language format from a first language to one or more different languages. Therefore, in various exemplary embodiments, translated informational content remains in its raw, extensible language format until it is rendered and provided to the end user based upon the language preference of the end user.

Broadly described, the systems and methods provided herein may allow content authors to select the type of translation utilized to translate the informational content based upon analytical data regarding the relative number of requests received from end users. For example, if the systems and methods determine that a substantial majority of end users are requesting the same type of informational content in the English language, the content authors may create an authoritative version of the informational content in the English language.

As such, requests for the same informational content in a language different from English require translation of the informational content by the systems and methods of the present technology.

Because the translation of informational content via human beings can be costly, the systems and methods may translate infrequent requested informational content by way of machine translation. Content authors may utilize the systems and methods provided herein to establish translation guidelines that are utilized to select an appropriate type of translation for each request received. For example, to reduce translation costs, content authors may specify that infrequent requests for informational content in a particular language may result in the translation of the informational content into the particular language via machine translators. The utilization of machine translators, rather than human translators results in significant cost savings for content authors. The ability for content authors to select the type of translation may be particularly important for content authors who provide content across a wide array of communication channels and in many languages.

In some embodiments, the systems and methods provide translated informational content to content authors before the translated informational content is provided to the end user. Content authors may trust score the translated informational content based upon the accuracy of the translated informational content. Content authors may specify that only translated informational content having a trust score above a threshold amount may be stored or provided to end users.

In additional embodiments, the systems and methods may provide content authors with the ability to edit translated informational content on-the-fly. Moreover, end users may provide feedback regarding the accuracy of the informational content, as to both the translation and the subject matter of the informational content. If the language utilized by the end user is different than the language utilized by the content author, the systems and methods may translate the feedback utilizing the language preference of the end user.

Upon the content author updating the translated informational content, the updated informational content may be translated from the language of the content author to the language of the end user either via machine translation or human translation.

In contrast to commonly utilized methods for translating informational content that are utilized to translate static content, the systems and methods of the present technology may translate informational content on-the-fly, responsive to user requests and utilizing the preferences of end users as determined by analytical data. Stated otherwise, rather than translating already rendered informational content, which may or may not correspond to the preferences of the end user, the systems and methods may render and translate informational content that specifically corresponds to the preferences of the end user. Stated otherwise, after the systems and methods have translated the informational content, the translated informational content is personalized to the end user based on their preferences. It will be understood that the preferences of the end user may be determined via an analysis of analytical data obtained from the end user.

The present technology may include machine translation features such as determining translation quality level, translating documents based on content, as well as incorporate other features. Exemplary features are described in U.S. patent application Ser. No. 12/510,913, entitled "Translating Documents Based On Content," filed on Jul. 28, 2009, U.S. patent application Ser. No. 12/572,021, entitled "Providing Machine-Generated Translations and Corresponding Trust Levels," filed on Oct. 1, 2009, U.S. patent application Ser. No. 12/720,536, entitled "Predicting the Cost Associated with Translating Textual Content," filed on Mar. 9, 2010, and U.S. patent application Ser. No. 12/820,061, entitled "Providing Human-Generated and Machine-Generated Trusted Translations," filed on Jun 21, 2010, the disclosures of the aforementioned applications are incorporated herein by reference.

Referring to FIG. 1, a schematic diagram of an exemplary architecture 100 for practicing aspects of the present technology is depicted. Generally speaking, the architecture 100 may include a plurality of client devices 105A (shown herein as a single client device 105A) that are communicatively coupled to one or more publishing servers 110 (shown herein as a single publishing server 110) via a network 115. The network 115 may include any one of a number of different communication channels, and in some embodiments may include the Internet. It will be understood that the client devices 105A may be utilized by content authors to establish translation guidelines and review translations for accuracy, as will be described in greater detail herein.

In some implementations, the respective functionalities of the publishing server 110 may be distributed across a plurality of servers that reside in a cloud computing configuration (not shown).

The architecture 100 may also include a plurality of visitor devices 105B (shown herein as a single visitor device 105B) communicatively coupled to the publishing server 110 via the network 115. The visitor device 105B may be associated with visitors that request and receive information content via the publishing server 110.

Both the client device 105A and the visitor device 105B may include any general purpose computing system that may implement a web browser application or other suitable applications adapted to request and provide information (such as web content) to and from the publishing server 110. A suitable exemplary client device 105A or visitor device 105B may include the computing system 400 disclosed with reference to FIG. 4. Additionally, the publishing server 110 may also include many of the components of computing system 400, although specific implementational and structural details regarding the publishing server 110 will be provided below.

As stated above, the publishing server 110 may be adapted to generate analytical data and utilize the generated analytical data to dynamically generate informational content. For example, the publishing server 110 may be adapted to generate analytical data from actions performed on the publishing server 110 by one or more visitor devices 105B.

According to some embodiments, the publishing server 110 may be adapted to translate informational content on-the-fly, responsive to user requests. Additionally, the publishing server 110 may be adapted to select informational content to be translated by evaluating analytical data associated with visitor devices 105B. It will be understood that the analytical data may be generated from an analytical data gathering module 135, which will be described in greater detail below. It will further be understood that analytical data may include device configuration information, language preference, behavioral information, demographical information, and so forth, gathered from the visitor device 105B.

According to some embodiments, the publishing server 110 may be communicatively coupled to a database 125 that is utilized by content authors to store informational content. In some embodiments, the database 125 includes an extensible markup language (XML) database. Informational content generated by the content authors may be stored in the XML database in a native XML format until requested by end users. It will be understood that the database 125 may utilize a Darwin Information Typing Architecture (DITA) for authoring, producing, and delivering information, although one of ordinary skill in the art will appreciate that other types of information architectures may likewise be utilized in accordance with the present technology.

It will be understood that because the database 125 may be adapted to utilize DITA architecture, the publishing server 110 may be able to generate informational content in a variety of exemplary formats, such as portable document format (PDF) documents via extensible stylesheet language formatting objects (XSL-FO), extensible hypertext markup language, rich text format, and a plurality of application specific informational content formats (e.g., eclipse, java, oracle, and so forth.). While the database 125 has been disclosed as utilizing DITA architecture, one of ordinary skill in the art will appreciate that other types of data architectures may likewise be utilized in accordance with the present technology. In addition to generating informational content in a variety of formats, the systems and methods provided herein may generate informational content that is translated based upon the language preference of the end user.

Figure 2:
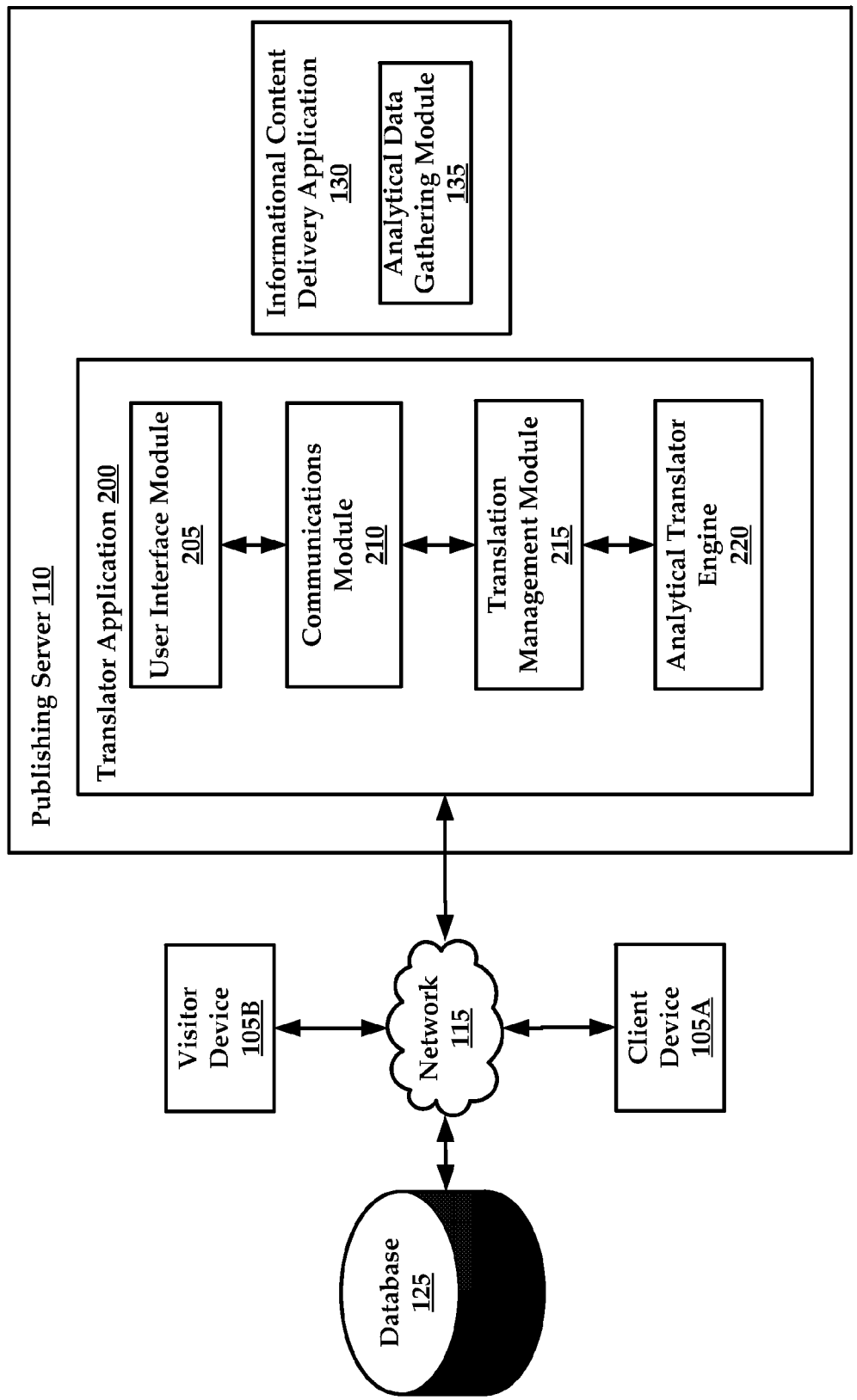
FIG. 2 illustrates an application adapted to translate informational content.

Referring now to FIGS. 1 and 2 collectively, the publishing server 110 may be described as a particular purpose computing system that includes executable instructions that when executed by the processor of the publishing server 110, cause the publishing server 110 to translate informational content in response to receiving a request for informational content by the client device 105A. The informational content selected for translation may include informational content that corresponds to analytical data gathered regarding the end user via the client device 105A. Generally speaking, the analytical data may include any of device configuration information, user profile information, language preferences, end user skill level, actions performed on a publishing server, and other conditions.

While the executable instructions resident on the publishing server 110 may include any number of modules, engines, applications, functions, and so forth, for the purposes of clarity, the executable instructions may be generally described as a translation application 200 having one or more modules.

Generally speaking, the translation application 200 may include a user interface module 205, a communications module 210, a translation management module 215, and an analytical translator engine 220. It will be understood that the translation application 200 may include fewer or more modules and/or engines and still fall within the scope of the present technology.

In some embodiments (such as in FIG. 1), the translation application 200 may include a standalone application executable via the client device 105A and the visitor device 105B. In other embodiments, the translation application may reside on another computing device (not shown) that is communicatively coupled to the publishing server 110. The translation application 200 may interact with the publishing server 110 and database 125. In additional embodiments (such as in FIG. 2), the translation application 200 may include a web-based application residing on the publishing server 110 that may be accessible via a web browser application resident on both the client device 105A or the visitor device 105B.

In some embodiments, the translation application 200 is communicatively coupled to an informational content delivery application 130 that includes an analytical data gathering module 135. Both the informational content delivery application 130 and the analytical data gathering module 135 may reside on the publishing server 110. Generally speaking, the informational content delivery application 130 may provide informational content that corresponds to analytical data gathered by the analytical data gathering module 135. That is, rather than providing end users with static informational content, the informational content delivery application 130 may provide end users with informational content that is tailored to the preference of the end user. Additional details regarding the analytical data gathering module 135 are provided in U.S. patent application Ser. No. 13/037,273, filed on Feb. 28, 2011, titled "SYSTEMS, METHODS, AND MEDIA FOR GENERATING ANALYTICAL DATA."

Content authors may interact with the translation application 200 via graphical user interface generated by the user interface module 205. That is, content authors may utilize graphical user interfaces to control the operation of one or more of the functionalities of the translation application 200. The functionalities of the translation application 200 will be discussed in greater detail below.

The communications module 210 may be adapted to receive requests for translated informational content from the visitor device 105B and provide translated informational content from the publishing server 110 to the visitor device 105B via the publishing server.

In some embodiments, the communications module 210 may communicatively couple the publishing server 110 and the client device 105A and the visitor device 105B via a security protocol. According to some embodiments, the communications module 210 may utilize a cryptographic application programming interface. In some embodiments, the translation application 200 may utilize a representational state transfer (RESTful) web service API.

Upon the visitor device 105A accessing the translation application 200, the translation application 200 may communicate with the analytical data gathering module 135 to gather information from the visitor device 105A. It will be understood that the analytical data gathering module 135 may operate transparently to the end user of the visitor device 105A.

As background, content authors may create authoritative versions of informational content that are stored the database 125. In some embodiments, the authoritative versions may be created in a language that is selected based upon analytical data gathered by the analytical data gathering module 135. The analytical data may correspond to a plurality of end users (gathered from visitor devices 105B associated with the end users) that frequently utilize informational content. As such, the authoritative versions of informational content may include informational content in one or more languages frequently utilized by the end users.

Upon receiving a request for informational content from the visitor device 105B, the translation management module 215 may be executed by the processor of the publishing server 110 to determine the language preference of the end user. The translation management module 215 may accomplish these ends by way of the analytical data gathering module 135. In some embodiments, the analytical data gathering module 135 may determine language preferences from informational content frequently accessed by the end user. In other embodiments, the translation management module 215 may determine language preference data by way of explicit information included in the request. For example, the end user may submit a request for informational content via a web form that allows the end user to specify a language preference.

If the language preference of the end user is the same as one or more authoritative versions of informational content stored on the database 125, the communications module 210 may provide the informational content to the end user without need for translation.

If the language preference of the end user is not the same as an authoritative version of the informational content stored on the database 125, translation management module 215 may be adapted to determine a type of translation that may be utilized to translate the informational content by way of translation guidelines established by the content authors. It will be understood that in some embodiments, the translation management module 215 may assign a translation priority level to each request that is utilized to determine the type of translation that will be utilized to translate the informational content. Additionally, the content authors may specify the details of the translation priority levels utilized by the translation management module 215.

In additional embodiments, content authors may specify that certain types of informational content may always be subject to machine translation, regardless of trust score. Content authors may specify that certain types of informational content may be subject to machine translation as long as the machine translation achieves a specific trust score. For example, content authors may specify that it is permissible for the analytical translator engine 220 to translate and provide the translated informational content to an end user if the translation achieves a trust score of three or greater. Additionally, content authors may specify that some types of informational content (such as critical informational content) are always translated ahead of time by one or more human translators.

According to some embodiments, the translation management module 215 may select the type of translation utilized to translate the informational content by determining a priority for the request. It will be understood that in some embodiments, the priority may be based upon aggregate demand or the criticality of the informational content.

For example, assuming that English is the language of the authoritative version of the requested informational content, requests for the informational content in a language different from the language of the authoritative version may be analyzed by the translation management module 215 to determine a priority of the translation.

If the priority of the translation is low, the translation management module 215 may instruct the analytical translator engine 220 to utilize one or more types of machine translation only. In contrast, if the priority of the translation is high, the analytical translator engine 220 may utilize one or more human translators. If the priority of the translation falls somewhere between low and high, combinations of both machine and human translation may be utilized.

In some embodiments, the priority of a translation may be determined by first establishing threshold levels indicative of aggregate numbers of requests for informational content relative to language preference. For example, threshold levels may be stratified into translation guidelines that include a first threshold amount, a second threshold amount, and a third threshold amount.

If the language preference of the request is the same as the language preference of the first threshold amount, the informational content may be translated by one or more human translators. If the language preference of the request is the same as the language preference of the second threshold amount, the informational content may be translated by both one or more human translators and one or more machine translators, and if the language preference of the request is the same as the language preference of the third threshold amount, the informational content may be translated by one or more machine translators only.

Moreover, the translation guidelines that are utilized by the translation management module 215 may be defined by the content authors. For example, the content author may specify the requirements of the threshold amounts.

In some embodiments, all human translation of informational content may be executed ahead of time, that is, before the informational content is provided to the end users. For example, using analytical data gathered from analytical data gathering module 135, a determination is made if informational content should be translated by a human ahead of time (prior to receiving requests) and then made available to end users. On the other hand, if informational content is not translated ahead of time via human translators, the informational content may be machine translated on the fly machine upon receiving a request for informational content.

Because content authors may specify how the translation management module 215 prioritizes the translation of informational content, the content authors may substantially reduce the cost of unnecessary translations of infrequently requested informational content. Correspondingly, content authors may delineate the types of informational content that may be translated by human translators, regardless of the frequency of use, based upon the criticality of the informational content. A non-limiting example of critical informational content may include an installation manual for a mechanical system, which if installed improperly may pose a significant danger to operators.

Content authors may specify that one or more human translators may translate critical informational content. In some embodiments, critical informational content may be translated a first time by one or more machine translators and a second time by one or more human translators. As such, the one or more human translators may verify the accuracy of the informational content translated by the one or more machine translators.

Once informational content has been translated into one or more languages, the translated informational content may be stored in the database 125. The translated informational content may be provided to end users upon subsequent request, without the need to subsequently translate the informational content.

In additional embodiments, when a content author modifies informational content in a particular language, the analytical translator engine 220 may be executed to locate previously translated versions of the informational content and translate the modifications into additional languages based upon previous translations. The translated modifications may be incorporated into the previously translated informational content by the analytical translator engine 220.

Rather than translating only the modifications, the analytical translator engine 220 may retranslate the entire informational content into additional languages. The translation of modifications may also be subject to prioritization by the content author. The ability of the analytical translator engine 220 to incorporate modifications into previously translated informational content is enhanced by the ability of the database 125 to retain the informational content in XML format.

After the analytical translator engine 215 has caused the translation of informational content by one or more of the above-described methods, the translated informational content may be provided, via the communications module 210, to one or more content authors for verification of the accuracy of the translation. In some embodiments, content authors may trust score a translation for accuracy. Therefore, translations receiving a trust score of less than a threshold trust score are rejected and may not be stored in the database 125 or provided to the visitor device 105B. In contrast, translations receiving a trust score of higher than a threshold trust score are approved and may be stored in the database 125 or provided to the visitor device 105B. Translations having a trust score that falls within a given range of values may optionally be retranslated and rescored by the content authors.

For example, one or more machine translators may translate informational content. Subsequent evaluations of the translations by content authors may result in the content authors associating the translations with a trust score that falls within the given range of values. As such, the content authors may specify that the translations be retranslated utilizing a second type of translator (e.g., human translators) that is different that the first type of translator (e.g., machine translators).

According to other embodiments, content authors may receive feedback from the end users regarding the translation of the informational content. Feedback may include data corresponding to the accuracy of the translation, the comprehensiveness of the informational content, and so forth. Because the end user may be utilizing a different language from the content author, the translation management module 215 may determine the language associated with the feedback. The language determined by the translation management module 215 may be utilized by the analytical translator engine 220 to translate the feedback into the language utilized by the content manager.

Any modifications of the informational content by the content author based upon the feedback may finally be translated into the language of the end user by the analytical translator engine 220. The previously translated informational content that is stored in the database 125 may be updated by the analytical translator engine 220 to reflect the modifications.

In other embodiments, the translation application 200 may provide content authors with a content editor (not shown) that is generated by the user interface module 205. The content editor provides the content author (or other authorized entities) the ability to quickly edit portions of translations of informational content based upon feedback received from end users, or from content authors reviewing the translation of the informational content.

If desired, changes to the informational content received from the content authors may be automatically translated and incorporated into previously translated informational content that resides on the database 125 via the analytical translator engine 220.

Figure 3:
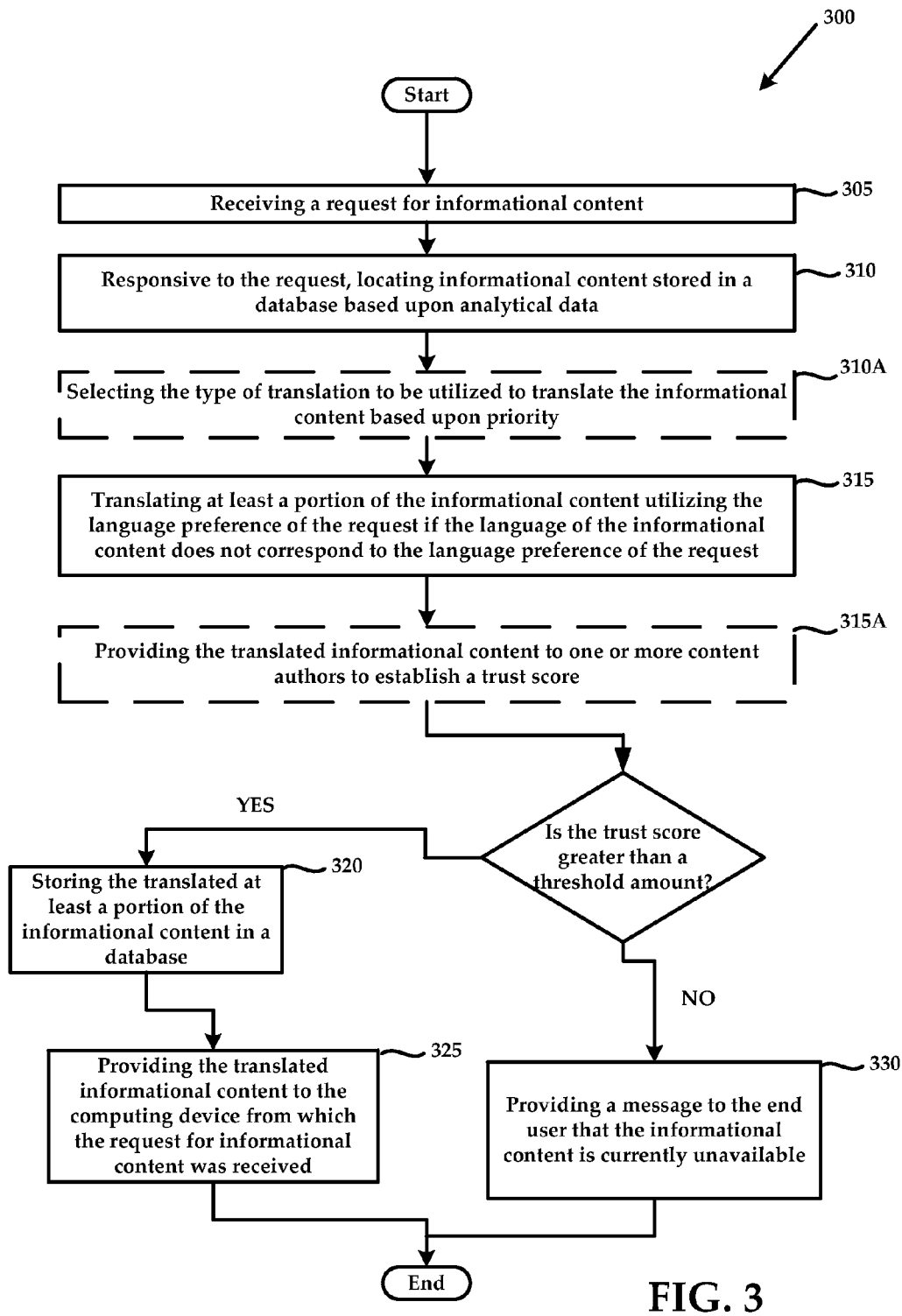
FIG. 3 is an exemplary flow diagram of a method for translating informational content.

FIG. 3 illustrates an exemplary flow chart of a method 300 for translating informational content. The method 300 may include a step 305 of receiving a request for informational content from a visitor device. It will be understood that the request may include a language preference. For example, the request may be received via the communications module of a translation application adapted to translate informational content. In other embodiments, the request may be received by an informational content delivery application that is communicatively coupled to a publishing server.

In operations where the request is received via an informational content delivery application, the informational content delivery application may provide the request to the translation application via the communications module of the translation application. It will be understood that the communications module of the translation application may utilize a secure protocol for transmitting data across a network.

Responsive to the request received in step 305, the method 300 may include the step 310 of locating informational content stored in a database, based upon analytical data corresponding to the visitor device from which the request was received. It will be understood that the analytical data may be gathered via an analytical data gathering module associated with the informational content delivery application. As stated previously, the database includes a wide variety of informational content stored in an XML format.

Next, the method 300 may include the step 315 of translating at least a portion of the informational content utilizing the language preference of the request, if the language of the informational content does not correspond to the language preference of the request. Finally, the method 300 may include the step 320 of storing the translated at least a portion of the informational content in the database associated with the publishing server. The translated informational content may be provided to the database via the secure protocol utilized by the communications module of the translation application.

The method 300 may include the optional step 310A of selecting the type of translation to be utilized to translate the informational content based upon priority. As described in greater detail above, infrequently requested informational content may be translated by machine translators, while more frequently requested informational content or critical informational content may be translated by human translators. The ability for content authors to select the type of translation to be utilized to translate informational content based upon priority may provide significant cost savings compared to methods that wholesale translate informational content without regard to priority. As such, the optional step 310A of selecting the type of translation to be utilized may be executed before the step 315 of translating.

Additionally, as has been stated previously, because the step 310A of translating occurs only when a request is received, unnecessary translation of informational content may be avoided, thus reducing overall translation costs. This is in contrast to typical methods for distributing translated informational content that includes translating informational content before a request or demand for the informational content has been determined.

The method 300 may also include an optional step 315A of providing the translated informational content to one or more content authors. The content authors may trust score the accuracy of the translation and specify that only translated informational content having a trust score above a threshold amount may be stored in the database or provided to an end user via their client device.

Assuming the translation of the informational content achieves a trust score above the threshold amount, the method 300 may include the step 325 of providing the translated informational content to the computing device from which the request for informational content was received.

On the other hand, if the trust score of a translation is below the threshold amount, the method 300 may include the step 330 of providing a message to the end user that the informational content is currently unavailable.

Figure 4:
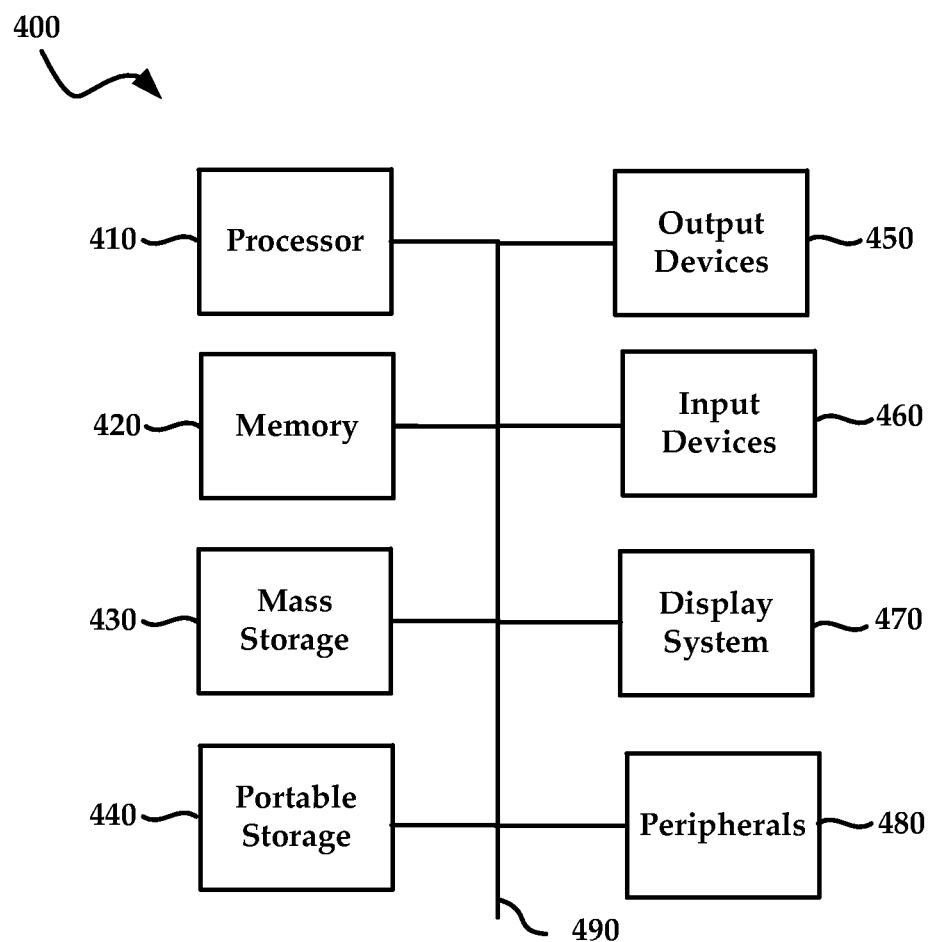
FIG. 4 is a block diagram of an exemplary computing system that may be utilized to practice aspects of the present disclosure.

FIG. 4 illustrates an exemplary computing system 400 that may be used to implement an embodiment of the present technology. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 440, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 410.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for translating informational content via a publishing server, comprising:
   receiving a request for informational content from a computing system, the request including a language preference;
   selecting a type of translation by:
      comparing the language preference of the request to translation guidelines to determine the type of translation that is to be utilized in the step of translating, the translation guidelines for determining the type of translation comprising:
         if the language preference of the request is the same as the language preference of a first threshold amount of additional requests for a same type of informational content as the request, the informational content is translated by one or more human translators,
         if the priority of the request is the same as the language preference of a second threshold amount of additional requests for a same type of informational content as the request, the informational content is translated by one or more human translators and one or more machine translators, and
         if the language preference of the request is the same as the language preference of a third threshold amount of additional requests for a same type of informational content as the request, the informational content is translated by one or more machine translators; and
      selecting the type of translation that is to be utilized in the step of translating based upon the comparison;
   responsive to the request, locating informational content stored in a database based upon analytical data corresponding to the computing system;
   translating, using the selected type of translation, at least a portion of the informational content utilizing the language preference of the request if a language of the informational content does not correspond to the language preference of the request; and
   storing the translated at least a portion of the informational content in the database associated with the publishing server.

2. The method according to claim 1, wherein translating includes a first translation of the at least a portion of the informational content via one or more machine translators before a second translation via one or more human translators.

3. The method according to claim 1, further comprising providing the translated at least a portion of the informational content to one or more content authors before providing the translated at least a portion of the informational content to one or more computing systems.

4. The method according to claim 3, further comprising:
   receiving from the one or more content authors a trust score that corresponds to the accuracy of the translated at least a portion of the informational content; and
   providing the translated at least a portion of the informational content to one or more computing systems if the trust score of the translated at least a portion of the informational content is above a threshold amount.

5. The method according to claim 4, further comprising retranslating the translated at least a portion of the informational content having a trust score below the threshold amount.

6. The method according to claim 1, further comprising receiving one or more modifications to the translated at least a portion of the informational content from one or more content authors and updating the translation of the at least a portion of the informational content with the one or more modifications.

7. The method according to claim 1, wherein the located informational content includes an extensible markup language format and a first language, and the translated at least a portion of the informational content includes the same extensible markup language format as the located informational content but in a second language that corresponds to the language preference of the request.

8. The method according to claim 1, further comprising selecting the type of translation by determining a criticality of the located informational content.

9. The method according to claim 1, further comprising:
   providing the translated at least a portion of the informational content to one or more computing systems;
   receiving feedback from one or more client devices in a first language corresponding to the translated at least a portion of the informational content;
   translating the feedback from the first language to a language utilized by one or more content authors if the language utilized by the one or more content authors is different than the first language;
   receiving modifications to the translated at least a portion of the informational content from the one or more client devices in the language utilized by the one or more content authors;
   incorporating the modifications into the translated at least a portion of the informational content;
   translating the modifications to the first language; and
   incorporating the modifications into the translated at least a portion of the informational content in the first language.

10. The method according to claim 1, further comprising receiving authorization to translate from at least one content manager before the step of translating at least a portion of the informational content.

11. A system for translating informational content via a publishing server, comprising:
   a memory for storing executable instructions for translating informational content; and
   a processor configured to execute the executable instructions stored in the memory to:
      receive a request for informational content from a computing system, the request including a language preference;
      select a type of translation by:
         comparing the language preference of the request to translation guidelines to determine the type of translation that is to be utilized in the step of translating, the translation guidelines for determining the type of translation comprising:
            if the language preference of the request is the same as the language preference of a first threshold amount of additional requests for a same type of informational content as the request, the informational content is translated by one or more human translators,
            if the priority of the request is the same as the language preference of a second threshold amount of additional requests for a same type of informational content as the request, the informational content is translated by one or more human translators and one or more machine translators, and if the language preference of the request is the same as the language preference of a third threshold amount of additional requests for a same type of informational content as the request, the informational content is translated by one or more machine translators; and selecting the type of translation that is to be utilized in the step of translating based upon the comparison;

responsive to the request, locate informational content stored in a database based upon analytical data corresponding to the computing system;

translate, using the selected type of translation, at least a portion of the informational content utilizing the language preference of the request if the language of the informational content does not correspond to the language preference of the request; and store the translated at least a portion of the informational content in the database associated with the publishing server.

12. The system according to claim 11, wherein translating includes a first translation of the at least a portion of the informational content via one or more machine translators before a second translation via one or more human translators.

13. The system according to claim 11, wherein the processor is further adapted to execute the instructions to provide the translated at least a portion of the informational content to one or more content authors before providing the translated at least a portion of the informational content to one or more computing systems.

14. The system according to claim 13, wherein the processor is further adapted to execute the instructions to:
receive from the one or more content authors a trust score that corresponds to the accuracy of the translated at least a portion of the informational content; and
provide the translated at least a portion of the informational content to one or more computing systems content if the trust score of the translated at least a portion of the informational content is above a threshold amount.

15. The system according to claim 14, wherein the processor is further adapted to execute the instructions to retranslate the translated at least a portion of the informational content having a trust score below the threshold amount.

16. The system according to claim 11, wherein the processor is further adapted to execute the instructions to receive one or more corrections to the translated at least a portion of the informational content from one or more content authors and update the translated at least a portion of the informational content with the one or more corrections.

17. The system according to claim 11, wherein the located informational content includes an extensible markup language format and a first language, and the translated at least a portion of the informational content includes the same extensible markup language format as the located informational content but in a second language that corresponds to the language preference of the request.

18. The system according to claim 11, wherein the processor is further adapted to execute the instructions to select the type of translation by determining a criticality of the informational content.

19. The system according to claim 11, wherein the processor is further adapted to execute the instructions to:
provide the translated at least a portion of the informational content to one or more computing systems;
receive feedback from the one or more computing systems in a first language corresponding to the translated at least a portion of the informational content;
translate the feedback from the first language to a language utilized by one or more content authors if the language utilized by the one or more content authors is different than the first language;
receive modifications to the translated at least a portion of the informational content from one or more client devices in the language utilized by the one or more content authors;
incorporate the modifications into the translated at least a portion of the informational content;
translate the modifications to the first language; and
incorporate the modifications into the translated at least a portion of the informational content in the first language.

20. The system according to claim 11, wherein the processor is further adapted to execute the instructions to receive authorization from at least one content manager before the step of translating at least a portion of the informational content.

21. A non-transitory computer readable storage medium having a computer program embodied thereon, the computer program executable by a processor in a computing system to perform a method for generating analytical data, the method comprising:
receiving a request for informational content from a computing system, the request including a language preference;
selecting a type of translation by:
comparing the language preference of the request to a translation guidelines to determine the type of translation that is to be utilized in the step of translating, the translation guidelines for determining the type of translation comprising:
if the language preference of the request is the same as the language preference of a first threshold amount of additional requests for a same type of informational content as the request, the informational content is translated by one or more human translators,
if the priority of the request is the same as the language preference of a second threshold amount of additional requests for a same type of informational content as the request, the informational content is translated by one or more human translators and one or more machine translators, and
if the language preference of the request is the same as the language preference of a third threshold amount of additional requests for a same type of informational content as the request, the informational content is translated by one or more machine translators; and
selecting the type of translation that is to be utilized in the step of translating based upon the comparison;
responsive to the request, locating informational content stored in a database based upon analytical data corresponding to the computing system;

translating, using the selected type of translation, at least a portion of the informational content utilizing the language preference of the request if a language of the informational content does not correspond to the language preference of the request; and storing the translated at least a portion of the informational content in the database associated with a publishing server.

\* \* \* \* \*